(12) United States Patent
Tyler

(10) Patent No.: US 10,625,467 B2
(45) Date of Patent: Apr. 21, 2020

(54) ADDITIVE MANUFACTURING SYSTEM HAVING ADJUSTABLE CURING

(71) Applicant: CC3D LLC, Coeur d'Alene, ID (US)

(72) Inventor: Kenneth Lyle Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 307 days.

(21) Appl. No.: 15/642,539

(22) Filed: Jul. 6, 2017

(65) Prior Publication Data

US 2018/0065298 A1 Mar. 8, 2018

Related U.S. Application Data

(60) Provisional application No. 62/383,801, filed on Sep. 6, 2016, provisional application No. 62/417,709, filed on Nov. 4, 2016, provisional application No. 62/459,398, filed on Feb. 15, 2017, provisional application No. 62/526,448, filed on Jun. 29, 2017.

(51) Int. Cl.
| | |
|---|---|
| *B29C 70/00* | (2006.01) |
| *B29C 64/209* | (2017.01) |
| *B29C 64/264* | (2017.01) |
| *B33Y 10/00* | (2015.01) |
| *B33Y 30/00* | (2015.01) |
| *B33Y 50/02* | (2015.01) |
| *B29C 64/118* | (2017.01) |

(52) U.S. Cl.
CPC .......... *B29C 64/209* (2017.08); *B29C 64/118* (2017.08); *B29C 64/264* (2017.08); *B33Y 10/00* (2014.12); *B33Y 30/00* (2014.12); *B33Y 50/02* (2014.12)

(58) Field of Classification Search
CPC ........................... B29C 64/209; B29C 64/264
See application file for complete search history.

(56) References Cited

U.S. PATENT DOCUMENTS

| 3,286,305 A | 11/1966 | Seckel |
|---|---|---|
| 3,809,514 A | 5/1974 | Nunez |

(Continued)

FOREIGN PATENT DOCUMENTS

| DE | 4102257 A1 | 7/1992 |
|---|---|---|
| EP | 2589481 B1 | 1/2016 |

(Continued)

OTHER PUBLICATIONS

Food Storage and Survival, "How to Start a Fire with a Magnifying Glass", Aug. 28, 2012, 1:10-1:20, Retrieved from: http://foodstorageandsurvival.com/how-to-start-a-fire-with-a-magnifying-lens/ on Dec. 18, 2017.

(Continued)

*Primary Examiner* — Galen H Hauth
(74) *Attorney, Agent, or Firm* — Ryan C. Stockett

(57) ABSTRACT

A system is disclosed for use in additively manufacturing a composite structure. The system may include a head having a nozzle configured to discharge a composite material including a matrix and a reinforcement, and a cure enhancer configured to direct energy to the composite material to enhance curing of the matrix. The system may also include an optic adjustably positioned between the cure enhancer and the nozzle of the head.

20 Claims, 3 Drawing Sheets

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,219,712 A * | 6/1993 | Evans | B29C 35/08 257/E21.502 |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,459,069 B1 | 10/2002 | Rabinovich | |
| 6,501,554 B1 | 12/2002 | Hackney et al. | |
| 6,803,003 B2 | 10/2004 | Rigali et al. | |
| 6,934,600 B2 | 8/2005 | Jang et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2004/0165156 A1 * | 8/2004 | Akiyama | G02B 26/008 353/84 |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2005/0288813 A1 | 12/2005 | Yang et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2015/0174824 A1 * | 6/2015 | Gifford | B29C 64/20 425/183 |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0121399 A1 | 5/2016 | Buller et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007362 A1 | 1/2017 | Chen et al. | |
| 2017/0007363 A1 | 1/2017 | Boronkay | |
| 2017/0007365 A1 | 1/2017 | Kopelman et al. | |
| 2017/0007366 A1 | 1/2017 | Kopelman et al. | |
| 2017/0007367 A1 | 1/2017 | Li et al. | |
| 2017/0007368 A1 | 1/2017 | Boronkay | |
| 2017/0007386 A1 | 1/2017 | Mason et al. | |
| 2017/0008333 A1 | 1/2017 | Mason et al. | |
| 2017/0015059 A1 | 1/2017 | Lewicki | |
| 2017/0015060 A1 | 1/2017 | Lewicki et al. | |
| 2017/0017067 A1 * | 1/2017 | Ohno | B29C 64/20 |
| 2017/0021565 A1 | 1/2017 | Deaville | |
| 2017/0028434 A1 * | 2/2017 | Evans | B29C 69/001 |
| 2017/0028588 A1 | 2/2017 | Evans et al. | |
| 2017/0028617 A1 | 2/2017 | Evans et al. | |
| 2017/0028619 A1 | 2/2017 | Evans et al. | |
| 2017/0028620 A1 | 2/2017 | Evans et al. | |
| 2017/0028621 A1 | 2/2017 | Evans et al. | |
| 2017/0028623 A1 | 2/2017 | Evans et al. | |
| 2017/0028624 A1 | 2/2017 | Evans et al. | |
| 2017/0028625 A1 | 2/2017 | Evans et al. | |
| 2017/0028627 A1 | 2/2017 | Evans et al. | |
| 2017/0028628 A1 | 2/2017 | Evans et al. | |
| 2017/0028633 A1 | 2/2017 | Evans et al. | |
| 2017/0028634 A1 | 2/2017 | Evans et al. | |
| 2017/0028635 A1 | 2/2017 | Evans et al. | |
| 2017/0028636 A1 | 2/2017 | Evans et al. | |
| 2017/0028637 A1 | 2/2017 | Evans et al. | |
| 2017/0028638 A1 | 2/2017 | Evans et al. | |
| 2017/0028639 A1 | 2/2017 | Evans et al. | |
| 2017/0028644 A1 | 2/2017 | Evans et al. | |
| 2017/0030207 A1 | 2/2017 | Kittleson | |
| 2017/0036403 A1 | 2/2017 | Ruff et al. | |
| 2017/0050340 A1 | 2/2017 | Hollander | |
| 2017/0057164 A1 | 3/2017 | Hemphill et al. | |
| 2017/0057165 A1 | 3/2017 | Waldrop et al. | |
| 2017/0057167 A1 | 3/2017 | Tooren et al. | |
| 2017/0057181 A1 | 3/2017 | Waldrop et al. | |

(56) References Cited

U.S. PATENT DOCUMENTS

| | | |
|---|---|---|
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

International Search Report dated Dec. 11, 2017 for PCT/US17/47400 to CC3D LLC Filed Aug. 17, 2017.

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Oct. 13, 2016 for PCT/US2016/042906 to CC3D LLC Filed Jul. 19, 2016.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schierner, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

ADDITIVE MANUFACTURING SYSTEM HAVING ADJUSTABLE CURING

RELATED APPLICATIONS

This application is based on and claims the benefit of priority from U.S. Provisional Application Nos. 62/383,801 that was filed on Sep. 6, 2016, 62/417,709 that was filed on Nov. 4, 2016, 62/459,398 that was filed on Feb. 15, 2017, and 62/526,448 that was filed on Jun. 29, 2017, the contents of all of which are expressly incorporated herein by reference.

TECHNICAL FIELD

The present disclosure relates generally to a manufacturing system and, more particularly, to an additive manufacturing system having adjustable curing.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications. In addition, conventional pultrusion manufacturing may lack flexibility in cure-rate, cure-shape, and/or cure-location of the liquid matrix.

The disclosed system is directed to addressing one or more of the problems set forth above and/or other problems of the prior art.

SUMMARY

In one aspect, the present disclosure is directed to an additive manufacturing system. The additive manufacturing system may include a head having a nozzle configured to discharge a composite material including a matrix and a reinforcement, and a cure enhancer configured to direct energy to the composite material to enhance curing of the matrix. The additive manufacturing system may also include an optic adjustably positioned between the cure enhancer and the nozzle of the head.

In another aspect, the present disclosure is directed to another additive manufacturing system. This additive manufacturing system may include a head having a nozzle configured to discharge a composite material including a matrix and a reinforcement, a support configured to move the head in multiple dimensions during discharging, and a plurality of cure enhancers mounted to the head around the nozzle and configured to direct energy to the composite material to enhance curing of the matrix. The additive manufacturing system may also include a plurality of convergent lenses associated with the plurality of cure enhancers, and a plurality of mounts. Each of the plurality of mounts may be configured to adjustably connect one of the plurality of convergent lenses to the head along a line that extends from an associated one of the plurality of cure enhancers to a tip of the nozzle. Adjustment of the plurality of convergent lenses may vary at least one of a shape, a size, a location and an intensity of a cure energy at the tip of the nozzle.

In yet another aspect, the present disclosure is directed to a method of additively manufacturing a three-dimensional structure from a composite material including a matrix and a reinforcement. The method may include wetting the reinforcement with the matrix inside of a head, and discharging wetted reinforcement from a nozzle of the head. The method may also include directing cure energy toward the wetted reinforcement to enhance curing of the matrix, and selectively adjusting a focal point of the cure energy.

DETAILED DESCRIPTION

Figure 1:
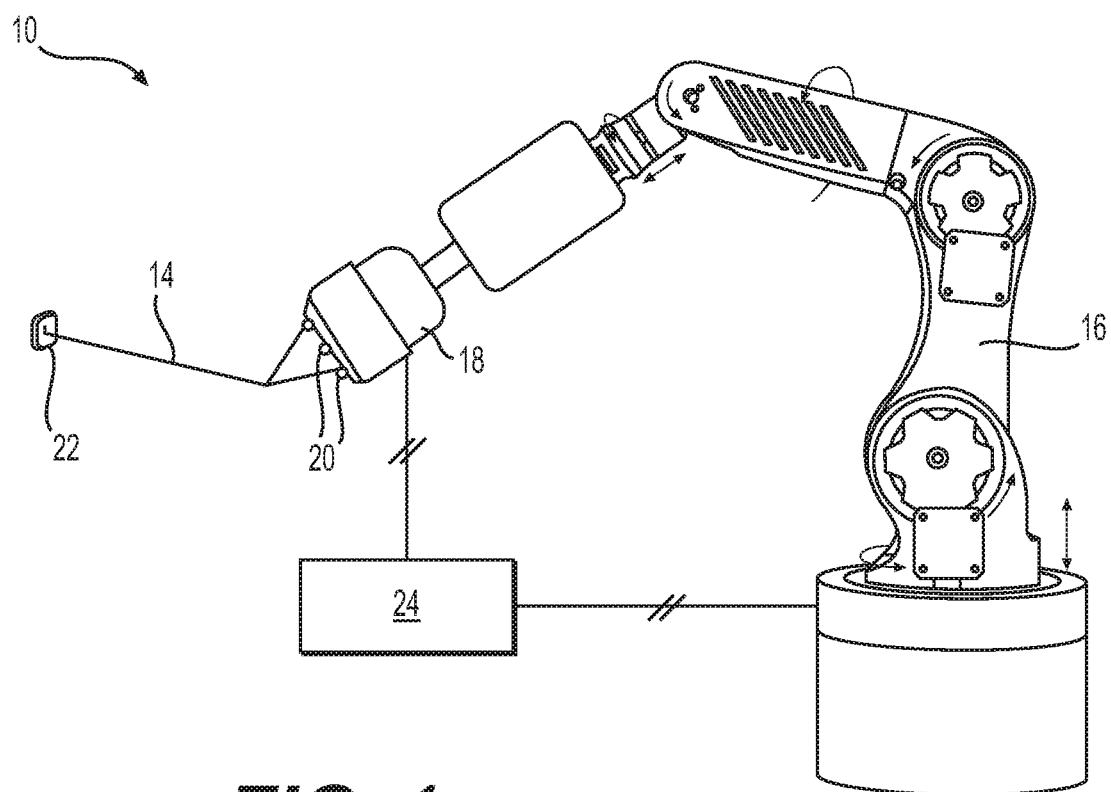
FIGS. 1 and 2 are diagrammatic illustrations of exemplary disclosed manufacturing systems.
Figure 2:
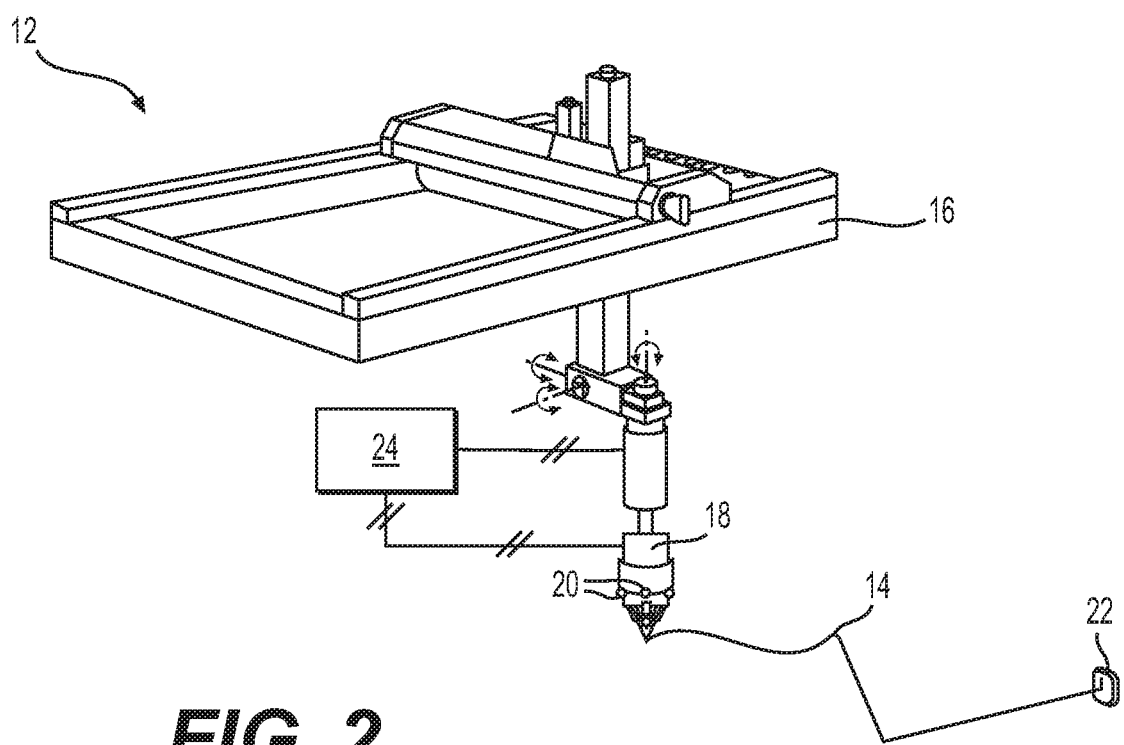

FIGS. 1 and 2 illustrate different exemplary systems 10 and 12, which may be used to continuously manufacture composite structures 14 having any desired cross-sectional shape (e.g., circular, polygonal, etc.). Each of systems 10, 12 may include at least a support 16 and a head 18. Head 18 may be coupled to and moved by support 16. In the disclosed embodiment of FIG. 1, support 16 is a robotic arm capable of moving head 18 in multiple directions during fabrication of structure 14, such that a resulting longitudinal axis of structure 14 is three-dimensional. In the embodiment of FIG. 2, support 16 is an overhead gantry also capable of moving head 18 in multiple directions during fabrication of structure 14. Although supports 16 of both embodiments are shown as being capable of 6-axis movements, it is contemplated that any other type of support 16 capable of moving head 18 in the same or in a different manner could also be utilized, if desired. In some embodiments, a drive may mechanically couple head 18 to support 16, and may include components that cooperate to move and/or supply power or materials to head 18.

Head 18 may be configured to receive or otherwise contain a matrix material. The matrix material may include any type of matrix material (e.g., a liquid resin, such as a zero volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 18 may be pressurized, for example by an external device (e.g., an extruder or another type of pump—not shown) that is fluidly connected to head 18 via a corresponding conduit (not shown). In another embodiment, however, the pressure may be generated completely inside of head 18 by a similar type of device. In yet other embodiments, the matrix material may be gravity-fed through and/or mixed within head 18. In some instances, the matrix material inside head 18 may need to be kept cool and/or dark to inhibit premature curing; while in other instances, the matrix material may need to be kept warm for the same reason. In either situation, head 18 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 14. The reinforcements may be stored within (e.g., on separate internal spools—not shown) or otherwise passed through head 18 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 18.

The reinforcements may be exposed to (e.g., coated with) the matrix material while the reinforcements are inside head 18, while the reinforcements are being passed to head 18, and/or while the reinforcements are discharging from head 18, as desired. The matrix material, dry reinforcements, and/or reinforcements that are already exposed to the matrix material (e.g., wetted reinforcements) may be transported into head 18 in any manner apparent to one skilled in the art.

One or more cure enhancers (e.g., a UV light, an ultrasonic emitter, a laser, a heater, a catalyst dispenser, etc.) 20 may be mounted proximate (e.g., within or on) head 18 and configured to enhance a cure rate and/or quality of the matrix material as it is discharged from head 18. Cure enhancer 20 may be controlled to selectively expose surfaces of structure 14 to energy (e.g., UV light, electromagnetic radiation, vibrations, heat, a chemical catalyst or hardener, etc.) during the formation of structure 14. The energy may increase a rate of chemical reaction occurring within the matrix material, sinter the material, harden the material, or otherwise cause the material to cure as it discharges from head 18. In the depicted embodiments, cure enhancer 20 includes multiple LEDs (e.g., 6 different LEDs) that are equally distributed about a center axis of head 18. However, it is contemplated that any number of LEDs or other energy sources could alternatively be utilized for the disclosed purposes and/or arranged in another manner (e.g., unequally distributed, arranged in a row, etc.). For example, cure enhancers 20 could be located on an arm (not shown) that trails behind head 18, if desired. The amount of energy produced by cure enhancer 20 may be sufficient to cure the matrix material before structure 14 axially grows more than a predetermined length away from head 18. In one embodiment, structure 14 is completely cured before the axial growth length becomes equal to an external diameter of the matrix-coated reinforcement.

The matrix material and reinforcement may be discharged from head 18 via at least two different modes of operation. In a first mode of operation, the matrix material and reinforcement are extruded (e.g., pushed under pressure and/or mechanical force) from head 18, as head 18 is moved by support 16 to create the 3-dimensional shape of structure 14. In a second mode of operation, at least the reinforcement is pulled from head 18, such that a tensile stress is created in the reinforcement during discharge. In this mode of operation, the matrix material may cling to the reinforcement and thereby also be pulled from head 18 along with the reinforcement, and/or the matrix material may be discharged from head 18 under pressure along with the pulled reinforcement. In the second mode of operation, where the matrix material is being pulled from head 18, the resulting tension in the reinforcement may increase a strength of structure 14, while also allowing for a greater length of unsupported material to have a straighter trajectory (i.e., the tension may act against the force of gravity to provide free-standing support for structure 14).

The reinforcement may be pulled from head 18 as a result of head 18 moving away from an anchor point 22. In particular, at the start of structure-formation, a length of matrix-impregnated reinforcement may be pulled and/or pushed from head 18, deposited onto an anchor point 22, and cured, such that the discharged material adheres to anchor point 22. Thereafter, head 18 may be moved away from anchor point 22, and the relative movement may cause the reinforcement to be pulled from head 18. It should be noted that the movement of reinforcement through head 18 could be assisted (e.g., via internal feed mechanisms), if desired. However, the discharge rate of reinforcement from head 18 may primarily be the result of relative movement between head 18 and anchor point 22, such that tension is created within the reinforcement. It is contemplated that anchor point 22 could be moved away from head 18 instead of or in addition to head 18 being moved away from anchor point 22.

A controller 24 may be provided and communicatively coupled with support 16, head 18, and any number and type of cure enhancers 20. Controller 24 may embody a single processor or multiple processors that include a means for controlling an operation of system(s) 10 and/or 12. Controller 24 may include one or more general- or special-purpose processors or microprocessors. Controller 24 may further include or be associated with a memory for storing data such as, for example, design limits, performance characteristics, operational instructions, matrix characteristics, reinforcement characteristics, characteristics of structure 14, and corresponding parameters of each component of system(s) 10 and/or 12. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system(s) 10 and/or 12 via wired and/or wireless transmission.

One or more maps may be stored in the memory of controller 24 and used during fabrication of structure 14. Each of these maps may include a collection of data in the form of lookup tables, graphs, and/or equations. In the disclosed embodiment, the maps are used by controller 24 to determine desired characteristics of cure enhancers 20, the associated matrix, and/or the associated reinforcements at different locations within structure 14. The characteristics may include, among others, a type, quantity, and/or configuration of reinforcement and/or matrix to be discharged at a particular location within structure 14, and/or an amount, shape, and/or location of curing. Controller 24 may then correlate operation of support 16 (e.g., the location and/or orientation of head 18) and/or the discharge of material from head 18 (a type of material, desired performance of the material, cross-linking requirements of the material, a discharge rate, etc.) with the operation of cure enhancers 20 such that structure 14 is produced in a desired manner.

Figure 4:
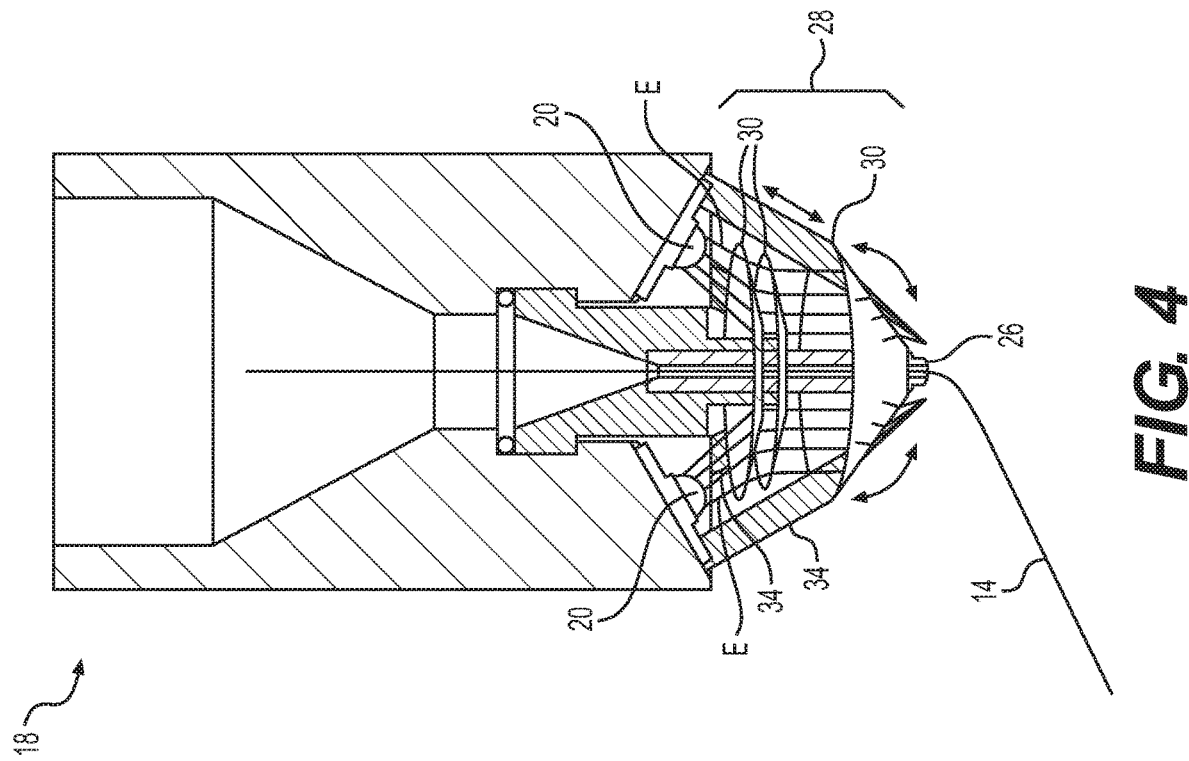
FIGS. 3 and 4 are diagrammatic illustrations an exemplary disclosed heads that may be used in conjunction with the manufacturing systems of FIGS. 1 and 2.
Figure 3:
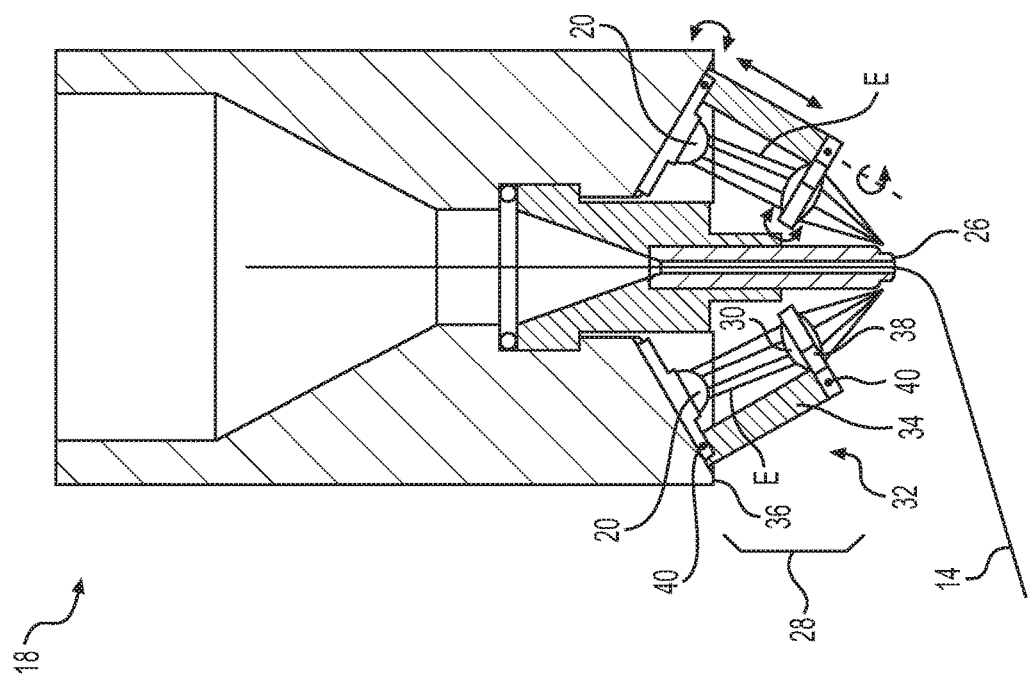

As shown in FIGS. 3 and 4, the energy E provided by each cure enhancer 20 may have a generally conical shape. The shape may have a smallest diameter at each cure enhancer 20 and an increasing diameter further away from cure enhancer 20. Unless otherwise accounted for, a static ring of energy having a static intensity level may be cooperatively formed around a nozzle 26 of head 18 by all of cure enhancers 20. While this static ring of energy may be suitable in some applications (e.g., in applications where nozzle 26 is circular and always discharges the same amount, type, shape, and/or configuration of composite material), the static ring may lack flexibility in accommodating differently shaped nozzles that discharge different amounts, types, shapes, and/or configurations of composite material.

Head 18 of FIGS. 3 and 4 may be provided with adjustable optics 28, which may be configured to increase the flexibility of composite material that can be discharged by nozzle 26 and properly cured by cure enhancer(s) 20. Optics 28 may include, among other things, at least one lens 30, and an adjustable mount 32 used to operatively connect lens 30 to head 18.

In the embodiment of FIG. 3, a plurality of lenses 30 may be provided. Each lens 30 may be a convergent-type of lens (e.g., a double- or plano-convex lens) associated with a different cure enhancer 20, and located between the associated cure enhancer 20 and a tip end of nozzle 26. Each lens 30 may be configured to focus the energy E received from cure enhancer 20 at a focal point near or at the tip end of nozzle 26. The focal point may be moved closer or further from the tip end of nozzle 26, for example, by changing a position of lens 30 within a straight line that extends between cure enhancer 20 and the tip end of nozzle 26 and/or by changing an orientation (e.g., an angle) of lens 30 relative to that line. By cooperatively changing the positions and/or orientations of two or more lenses 30, a shape, intensity, and/or location of energy around nozzle 26 may be adjusted. For example, the energy could form a circle, an ellipse, an oval, a rectangle, or another polygonal shape around nozzle 26; have a concentrated intensity or a diluted intensity; and be located immediately adjacent the tip of nozzle 26 or further away.

Mount 32 may connect lens 30 to head 18 in a way that allows adjustments to be made to the location and/or orientation of lens 30. In the embodiment of FIG. 3, a single mount 32 is used with each lens 30. It is contemplated, however, that one mount 32 could be used for two or more lenses 30, if desired. Mount 32 may include, among other things, a standoff 34 that extends between head 18 (e.g., a lower end surface 36 of head 18) and lens 30 (e.g., at a side edge of a support ring 38 that at least partially encircles lens 30).

In one embodiment, standoff 34 is a static component having a fixed length that is manually fastened between end surface 36 and support ring 38 to set lens 30 a desired offset distance away from the associated cure enhancer 20. When a different offset distance is desired, standoff 34 may be manually replaced with a different standoff 34 having a shorter or longer length. This change in offset distance may correspond with a change in position of the energy focal point along the line between cure enhancer 20 and the tip of nozzle 26. In some embodiments, changing the focal point of the cure energy may also change a width/diameter of a corresponding energy shape around the tip end of nozzle 26.

In another embodiment, standoff 34 forms a portion of a linear actuator (e.g., a piston or a lead screw). In this embodiment, under the regulation of controller 24 (referring to FIGS. 1 and 2), the linear actuator may be selectively energized to cause standoff 34 to expand or retract, thereby automatically adjusting the position of the associated lens 30.

It is contemplated that each lens 30 could be pivotally connected to head 18 via standoff 34, if desired. For example, lens 30 could be configured to pivot about an axis of standoff 34 to allow for the selective use of lens 30. That is, lens 30 could be positioned as shown in FIG. 3 within a path of energy extending from cure enhancer 20 to the tip of nozzle 26, or selectively pivoted about the axis of standoff 34 to be partially or completely out of the path.

In addition to or instead of each lens 30 being position-adjustable, each lens 30 may be orientation-adjustable. For example, standoff 34 could be rotationally connected to end surface 36 and/or to support ring 38 via one or more pivot pins 40. With this configuration, all of lens 30 and mount 32 or only lens 30 may be pivoted radially inward toward nozzle 26 or radially outward away from nozzle 26, causing the corresponding focal point to also move radially inward or outward. It is contemplated that, in some instances, lens 30 may be pivoted completely out of the energy path such that little, if any, energy from cure enhancer 20 passes through or is otherwise affected by lens 30. In the same manner described above with regard to length changes of standoff 34, the pivoting of lens 30 (or both lens 30 and mount 32) may be manually implemented or automatically implemented (e.g., via a rotary actuator—represented by pivot pin(s) 40—under the regulation of controller 24), as desired.

As described above, the location, shape, and/or intensity of the energy around the tip of nozzle 26 may be coordinated with the type, size, and/or shape of nozzle 26 and/or the quantity, type, shape, rate, and/or configuration of material discharging from nozzle 26. For example, the orientation of lens(es) 30 may be set to a particular angle when a first (e.g., a round) nozzle 26 is connected to head 18, and adjusted to a different angle when a second (e.g., a rectangular) nozzle 26 is connected to head 18. In another example, the standoff distance of lens(es) 30 may be set to a first distance when a first amount, type, shape, rate, and/or configuration of composite material is discharging from nozzle 26, and adjusted to a second distance when a second amount, type, shape, rate, and/or configuration of composite material is discharging from nozzle 26.

It is also contemplated that controller 24 could regulate operation of cure enhancer(s) 20 in coordination with the manual and/or automatic adjustments made to optics 28. For example, controller 24 may be configured to selective turn particular cure enhancer(s) on or off and/or change the intensity or wavelength of particular cure enhancer(s) 20 based at least partially on the standoff position and/or orientation of the associated lens(es) 30. Alternatively, the adjustments of cure enhancer(s) 20 may be made at the same time as the adjustments to optics 28 and in response to the above-described operational characteristics of nozzle 26 and/or the composite material discharging from nozzle 26.

In the embodiment of FIG. 4, one or more common lenses 30 are used with two or more cure enhancers 20. For example, one or more ring-like convex lenses (e.g., plano-convex or concavo-convex lenses) 30 are placed around nozzle 26 (i.e., with nozzle 26 extending through an open center) and between all of cure enhancers 20 and the tip of nozzle 26. These lenses 30 may be used to focus the energy from cure enhancers 20 into a ring shape having an annular focus. In this embodiment, static or linearly adjustable (e.g., manually or automatically adjustable) standoffs 34 may be used to adjust a position and/or orientation of lens(es) 30.

Figure 6:
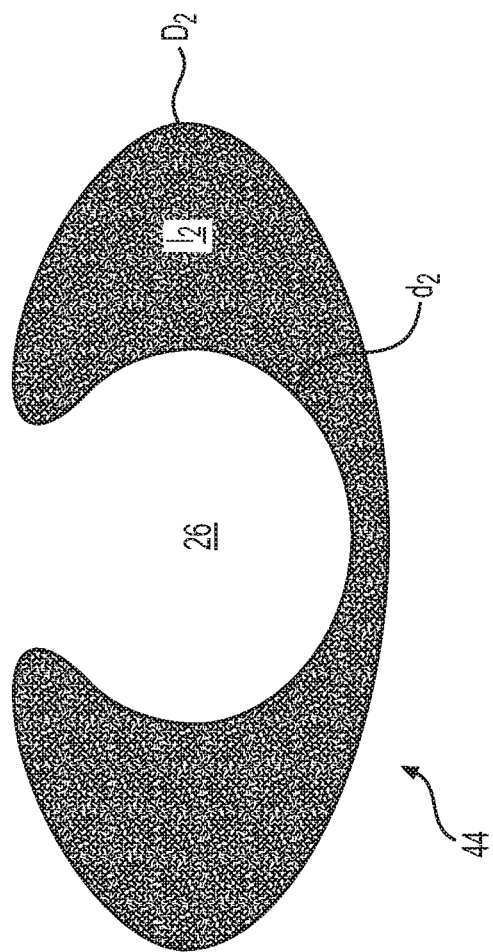
FIGS. 5-7 are diagrammatic illustrations of exemplary energy shapes that may be created by the heads of FIGS. 3 and 4 during operation of the systems of FIGS. 1 and 2.
Figure 7:
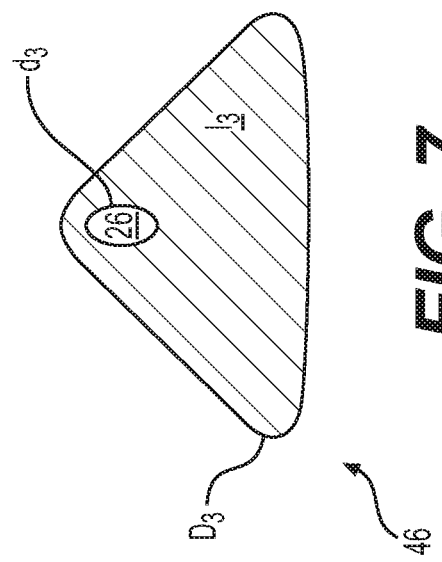
Figure 5:
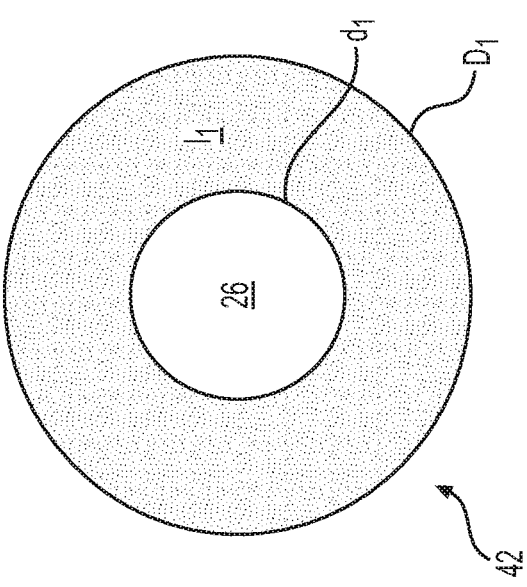

FIGS. 5-7 illustrate exemplary energy shapes that may be created around the tip end of nozzle 26 during discharge of composite material. These shapes may be created by moving lenses 30 closer to or further away from the tip of nozzle 26, pivoting lenses 30 about the axes of standoffs 34, pivoting lenses 30 about pivot pins 40, and/or adjusting operation of (e.g., turning on/off and/or varying an intensity or wavelength level of) cure enhancers 20. FIG. 5 illustrates a generally circular energy ring 42 formed completely around the tip of nozzle 26. Ring 42 may have a first outer diameter $D_1$, a first inner diameter $d_1$, and a first intensity level $I_1$. FIG. 6 illustrates a generally oval or ellipsoid energy ring 44 formed at least partially around the tip of nozzle 26. Ring 44 may have an outer diameter $D_2$ that is different from outer diameter $D_1$, an inner diameter $d_2$ that is different from inner diameter $d_1$, and a second intensity level $I_2$ that is different from first intensity level $I_1$. In addition, energy ring 44 may be interrupted. That is, energy ring 44 may not pass completely around nozzle 26, and the interruption may be created by de-energizing particular cure enhancer(s) 20 and/or re-orienting lens(es) 30 to extreme angles. FIG. 7 illustrates a polygonal energy shape 46 formed around the tip of nozzle 26. Energy shape 46 may have any number of corners (e.g., rounded corners), with any outer dimension $D_3$ that is different from diameters $D_1$ and $D_2$. In addition, energy shape 46 may have a circular, oval, ellipsoid, or polygonal inner space in which the tip of nozzle 26 is located. The inner space may have a diameter $d_3$ that is different than diameters $d_1$ and $d_2$, and may or may not be centered within energy shape 46. For instance, the inner space may be located at a leading end of energy shape 46, with a majority of energy shape 46 located at a trailing side of nozzle 26. It is contemplated that additional and different energy shapes may be formed via adjustment of lenses 30 and/or cure enhancers 20, if desired.

INDUSTRIAL APPLICABILITY

The disclosed systems may be used to continuously manufacture composite structures having any desired cross-sectional shape, length, density, and/or strength. The composite structures may include any number of different reinforcements of the same or different types, diameters, shapes, configurations, and consists, and/or any number of different matrixes. In addition, the disclosed systems may allow for use with a variety of different nozzles and for adjustable curing of a variety of discharging materials. Operation of systems 10 and 12 will now be described in detail.

At a start of a manufacturing event, information regarding a desired structure 14 may be loaded into systems 10 and 12 (e.g., into controller 24 that is responsible for regulating operations of support 16, head 18, and/or cure enhancer(s) 20). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, desired cure rates, cure locations, cure shapes, cure amounts, etc. It should be noted that this information may alternatively or additionally be loaded into systems 10 and 12 at different times and/or continuously during the manufacturing event, if desired.

Based on the component information, a specific nozzle 26 may be connected to head 18, and one or more different reinforcements and/or matrix materials may be selectively installed within system(s) 10, 12 and/or continuously supplied into nozzle 26. In some embodiments, the reinforcements may also need to be connected to a pulling machine (not shown) and/or to a mounting fixture (e.g., to anchor point 22). Installation of the matrix material may include filling head 18 and/or coupling of an extruder (not shown) to head 18. Head 18 may then be moved by support 16 under the regulation of controller 24 to cause matrix-coated reinforcements to be placed against or on a corresponding anchor point 22. Cure enhancers 20 may then be selectively activated (e.g., turned on/off and/or intensity-adjusted) to cause hardening of the matrix material surrounding the reinforcements, thereby bonding the reinforcements to anchor point 22.

The component information may then be used to control operation of systems 10 and 12. For example, the reinforcements may be pulled and/or pushed from head 18 (along with the matrix material), while support 16 selectively moves head 18 in a desired manner, such that an axis of the resulting structure 14 follows a desired trajectory (e.g., a free-space, unsupported, 3-D trajectory). In addition, cure enhancers 20 may be selectively activated by controller 24 and lenses 30 adjusted to specific positions and/or orientations during material discharge from nozzle 26, such that a corresponding amount of energy E from cure enhancer(s) 20 is absorbed by the discharging material at a desired location and in a desired shape. Once structure 14 has grown to a desired length, structure 14 may be disconnected (e.g., severed) from head 18 in any desired manner. In some embodiments, adjustments may be made to optics 28 that are specific to anchoring processes, and different than optic adjustments made during general fabrication of structure 14. Controller 24 may implement these different adjustments automatically based on a phase of an ongoing fabrication process.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:
1. An additive manufacturing system, comprising:
   a head having an outlet configured to discharge a composite material including a matrix and a reinforcement;
   a cure enhancer configured to direct energy in a direction to the composite material at the outlet to enhance curing of the matrix, the direction being generally oblique relative to a central axis of the head;
an optic adjustably positioned between the cure enhancer and the outlet of the head; and
a standoff having a central axis generally parallel with the direction of the energy and connecting the optic to the head.

2. The additive manufacturing system of claim 1, wherein the optic includes
at least one lens; and
at least one pin pivotally connecting the standoff to at least one of the at least one lens and the head.

3. The additive manufacturing system of claim 2, wherein at least one of the
standoff and
the at least one pin allows the at least one lens to selectively pivot completely out of a path of the energy.

4. The additive manufacturing system of claim 2, wherein the standoff facilitates adjustment of a position of the at least one lens along the direction of the energy.

5. The additive manufacturing system of claim 4, wherein the at least one pin additionally facilitates adjustment of an orientation of the at least one lens relative to the direction of the energy.

6. The additive manufacturing system of claim 2, wherein the at least one lens is a convergent lens.

7. The additive manufacturing system of claim 6, wherein the convergent lens is a double convex lens.

8. The additive manufacturing system of claim 6, wherein the convergent lens is one of a plano-convex and concavo-convex lens.

9. The additive manufacturing system of claim 2, wherein:
the cure enhancer is one of a plurality of cure enhancers; and
the at least one lens includes one lens associated with each of the plurality of cure enhancers.

10. The additive manufacturing system of claim 2, wherein:
the cure enhancer is one of a plurality of cure enhancers; and
the at least one lens is common to all of the plurality of cure enhancers.

11. The additive manufacturing system of claim 2, wherein the cure enhancer is mounted to the head.

12. The additive manufacturing system of claim 1, wherein the optic is manually adjustable.

13. The additive manufacturing system of claim 1, further including:
an actuator associated with the optic; and
a controller configured to:
receive information regarding a structure to be manufactured with the composite material; and
regulate operation of the actuator based on the information.

14. The additive manufacturing system of claim 1, wherein adjustment of the optic varies a cure energy at the outlet.

15. The additive manufacturing system of claim 14, wherein the adjustment of the optic results in a change in a shape of the cure energy at the outlet.

16. The additive manufacturing system of claim 1, further including a support configured to move the head in multiple dimensions during discharging.

17. An additive manufacturing system, comprising:
a head having an outlet configured to discharge a composite material including a matrix and a reinforcement;
a support configured to move the head in multiple dimensions during discharging;
a light source mounted to the head at the outlet and configured to direct energy to the composite material to enhance curing of the matrix;
at least one lens associated with the light source; and
a mount configured to adjustably connect the at least one lens to the head along a line that extends from light source to the outlet,
wherein adjustment of the at least one lens changes a shape of the energy at the outlet.

18. An additive manufacturing system, comprising:
a head having an outlet configured to discharge a composite material including a matrix and a reinforcement;
a support configured to move the head in multiple dimensions during discharging;
a light source mounted to the head adjacent the outlet and configured to direct energy to the composite material to enhance curing of the matrix;
a lens disposed in a path of light extending to the outlet of the head; and
a mount configured to selectively pivot the lens completely out of the path of the light.

19. The additive manufacturing system of claim 18, wherein the lens is adjustably mounted to the head to vary a distance of the lens along the path.

20. The additive manufacturing system of claim 18, wherein the lens is adjustably mounted to the head to vary an angular orientation of the lens relative to the path.

* * * * *